US008612940B2

United States Patent
Kahlon et al.

(10) Patent No.: US 8,612,940 B2
(45) Date of Patent: Dec. 17, 2013

(54) LOCK REMOVAL FOR CONCURRENT PROGRAMS

(75) Inventors: Vineet Kahlon, Princeton, NJ (US); Chao Wang, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 401 days.

(21) Appl. No.: 13/008,650

(22) Filed: Jan. 18, 2011

(65) Prior Publication Data

US 2011/0276969 A1 Nov. 10, 2011

Related U.S. Application Data

(60) Provisional application No. 61/331,933, filed on May 6, 2010.

(51) Int. Cl.
*G06F 9/44* (2006.01)
(52) U.S. Cl.
USPC ............................ 717/131; 717/104; 717/120
(58) Field of Classification Search
USPC ................. 717/120–121, 131–133, 104–105
See application file for complete search history.

(56) References Cited

PUBLICATIONS

Bhargava et al., "A Causal Model for Analyzing Distributed Concurrency Control Algorithms", 1983, IEEE, pp. 470-486.*
Rajwar, "Speculation-Based Techniques for Transactional Lock-Free Execution of Lock-Based Programs", 2002, University of Wisconsin—Madison, pp. i-xiii, 1-209.*
Desel et al., ""What Is a Petri Net?" Informal Answers for the Informed Reader", 2001, Springer-Verlag Berlin Heidelberg, pp. 1-25.*
Aldrich, J., et al., "Static Analyses for Eliminating Unnecessary Synchronization From Java Programs", Department of Computer Science and Engineering, Sep. 1999, (20 pages).
Bogda, J., et al., "Removing Unnecessary Synchronization in Java", Department of Computer Science and Engineering, Apr. 1999, (12 pages).
Ruf, E., et al., "Effective Synchronization Removal for Java", Microsoft Research, Jun. 2000, pp. 208-218.

* cited by examiner

*Primary Examiner* — Ted T Vo
(74) *Attorney, Agent, or Firm* — Joseph Kolodka (57) ABSTRACT

A system and method are disclosed for removing locks from a concurrent program. A set of behaviors associated with a concurrent program are modeled as causality constraints. The causality constraints which preserve the behaviors of the concurrent program are identified. Having identified the behavior preserving causality constraints, the corresponding lock and unlock statements in the concurrent program are identified which enforce the identified causality constraints. All identified lock and unlock statements are retained, while all other lock and unlock statements are discarded.

20 Claims, 5 Drawing Sheets

| Thread 1 ($x^1$) | Thread 2 ($x^2$) |
|---|---|
| 0a: ------; | 0b: ------; |
| 1a: lock(A); | 1b: ------; |
| 2a: ------; | 2b: ------; |
| 3a: unlock(A); | 3b: lock(A); |
| 4a: ------; | 4b: lock(B); |
| 5a: lock(A); | 5b: ------; |
| 6a: lock(B); | 6b: unlock(B); |
| 7a: ------; | 7b: unlock(A); |
| 8a: unlock(B); | 8b: sh++; |
| 9a: unlock(A); | |
| 10a: sh++; | |

$(\phi,\phi,\phi,\phi,\phi,\phi) \rightarrow \{ (0a,0a),(0a,1a),(1a,1a),(5a,5a),(10a,10a) \}$ $(\phi,\phi,\phi,\phi,\phi,\{A\}) \rightarrow \{ (1a,5a) \}$ $(\phi,\{A\},\phi,\{(A,\{\})\},\phi,\{A\},) \rightarrow \{ (5a,6a) \}$ $(\{A\},\{A\},\phi,\phi,\{A\},\phi) \rightarrow \{ (6a,6a) \}$ $(\{A\},\phi,\{(A,\{B\})\},\phi,\phi,\{B\},) \rightarrow \{ (6a,10a) \}$

(b)

$(\phi,\phi,\phi,\phi,\phi,\phi) \rightarrow \{ (0b,0b),(0b,3b),(3b,3b),(8b,8b) \}$ $(\phi,\{A\},\phi,\{(A,\{\})\},\phi,\{A\}) \rightarrow \{ (3b,4b) \}$ $(\{A\},\{A\},\phi,\phi,\{A\},\phi) \rightarrow \{ (4b,4b) \}$ $(\{A\},\phi,\{(A,\{B\})\},\phi,\phi,\{B\},) \rightarrow \{ (4b,8b) \}$

(c)

$(\phi,\phi,\phi,\phi,\phi,\phi) \rightarrow \{ (0a,0a),(0a,1a),(1a,1a),(5a,5a),(10a,10a) \}$ $(\phi,\phi,\phi,\phi,\phi,\{A\}) \rightarrow \{ (1a,5a),(5a,10a) \}$

(d)

$(\phi,\phi,\phi,\phi,\phi,\phi) \rightarrow \{ (0b,0b),(0b,3b),(3b,3b),(8b,8b) \}$ $(\phi,\phi,\phi,\phi,\phi,\{A\}) \rightarrow \{ (3b,8b) \}$

Figure 3C

| Thread 1 ($x^1$) | Thread 2 ($x^2$) |
|---|---|
| 0a: ------; | 0b: ------; |
| 1a: ------; | 1b: ------; |
| 2a: ------; | 2b: ------; |
| 3a: ------; | 3b: ------; |
| 4a: ------; | 4b: ------; |
| 5a: ------; | 5b: ------; |
| 6a: ------; | 6b: ------; |
| 7a: ------; | 7b: ------; |
| 8a: ------; | 8b: sh++; |
| 9a: ------; | |
| 10a: sh++; | |

LOCK REMOVAL FOR CONCURRENT PROGRAMS

RELATED APPLICATION INFORMATION

This application claims priority to provisional application Ser. No. 61/331,933 filed on May 6, 2010, incorporated herein by reference.

BACKGROUND

1. Technical Field

The present invention relates to removing locks in a concurrent program, and more particularly, to removing locks from a concurrent program in manner that preserves the behaviors of the concurrent program.

2. Description of the Related Art

A concurrent program is comprised of several threads that are executed in parallel. These types of programs are behaviorally complex due to the fact that the threads of such programs execute in a noncontiguous or interleaved fashion. The noncontiguous or interleaved nature of a concurrent program makes it extremely difficult to identify or determine all the possible ways in which threads interact among themselves.

In view of the aforementioned difficulties, programmers often take an overprotective stance when creating concurrent programs. More specifically, programmers will tend to label large sections of code as critical sections to ensure that there is mutual exclusion with respect to shared objects, variables, etc. As a result, a concurrent program may include more locks than is necessary. The inclusion of these additional or superfluous locks may degrade the performance of the program and tends to make program analysis difficult.

SUMMARY

In accordance with the present principles, a method is disclosed for removing locks from a concurrent program. A set of behaviors associated with a concurrent program are modeled as causality constraints. The causality constraints which preserve the behaviors of the concurrent program are identified. Having identified the behavior preserving causality constraints, the corresponding lock and unlock statements in the concurrent program are identified which enforce the identified causality constraints.

In accordance with the present principles, a system is also disclosed for removing locks from a concurrent program. The system includes a constraint modeler configured to specify a set of behaviors associated with a concurrent program as causality constraints, as well as a constraint identifier configured to identify the causality constraints which preserve a set of behaviors associated with the concurrent program. The system further includes a lock identifier configured to identify lock and unlock statements in the concurrent program which enforce the identified causality constraints.

In accordance with the present principles, another method is disclosed for removing locks from a concurrent program. A set of behaviors associated with a concurrent program are modeled as causality constraints. The causality constraints which preserve the behaviors of the concurrent program are identified using at least one lock acquisition history. The lock and unlock statements in the concurrent program which enforce the identified causality constraints are also identified using at least one lock acquisition history. The lock and unlock statements which enforce the identified causality constraints are retained, while the lock and unlock statements which do not enforce the identified causality constraints are discarded.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

A global computation of a concurrent program is an interleaving of the local computations associated with the threads of the program. However, concurrent programs do not allow unrestricted interleavings. Rather, various different synchronization primitives (e.g., mutexes, shared/exclusive locks, wait/notify statements, semaphores, etc.) can be inserted into a concurrent program to control the permitted set of computations. Thus, for example, locks can be employed to guarantee mutually exclusive access to shared resources (e.g., to guarantee that only one thread has access to a particular variable), and wait/notify statements can be used to enforce happens-before constraints between operations of different threads (e.g., to enforce the order in which threads execute operations).

As explained above, concurrent programs are behaviorally complex due to the fact that the threads of such programs execute in a noncontiguous or interleaved fashion. As a result, programmers often take an overprotective stance when creating concurrent programs by labeling large sections of code as critical sections. This often leads to a concurrent program which includes more locks than is necessary. The inclusion of these additional locks may degrade the performance of the program and tends to make program analysis difficult. Removing these extraneous locks permits concurrent programs to be analyzed faster, improves performance of the programs and allows more interleaving amongst the threads of the program.

Accordingly, the inventive principles described herein provide a general technique for removing locks from a concurrent program. A goal of this lock removal technique is to identify and remove unnecessary lock and unlock statements set forth in a given concurrent program, while preserving the set of program behaviors associated with the program. In general, this can be accomplished by classifying the behaviors of concurrent programs as happens-before relations on shared variable accesses, and maintaining a set of partial orders that indicate the proper sequence in which shared variables of the concurrent program may be accessed by the various threads of the concurrent program.

Hence, the computations associated with a concurrent program are represented as happens-before relations on shared variable accesses. This characterization stems from the observation that the execution of two threads (or more) which update the same shared variable in different relative orders may lead to different values of the shared variable, and hence different program behaviors. However, on the other hand, executing transitions of different threads accessing (reading or writing) disjoint sets of variables in different relative orders leads to the same program state.

Moreover, it has also been observed that the execution of two different threads produces the same program behavior where only thread local variables are accessed by the threads in different relative orders. In this case, the result leads to the same global state. Thus, two computations x and y of a concurrent program that differ only in the relative order of thread local operations can be considered equivalent, and the two computations x and y will only lead to different program behaviors if the transitions of threads accessing the shared variables are executed in different relative orders along x and y.

An immediate corollary of classifying behaviors of concurrent programs as happens-before relations on shared variable accesses is that two interleavings can be regarded as equivalent if they induce the same global orders on shared object accesses. As such, the present lock removal strategy eliminates locks in a way that does not introduce more behaviors (i.e., in such a way that does not make more global orders feasible).

To accomplish this goal, acquisition histories may be utilized. Acquisition histories permit the static reachability of a concurrent program with nested locks to be decided in an efficient manner using "thread local reasoning". These acquisition histories are compositional in nature in the sense that they permit the reachability between global control states to be decided by tracking lock access patterns locally in each individual thread.

In view of the above, the present principles provide a unified model which captures the happens-before constraints imposed by a property (e.g., an atomicity requirement or data race), as well as the scheduling constraints imposed by synchronization primitives as causality constraints. Embedding all of these constraints into one common framework permits the present principles to exploit the synergy among the constraints which are imposed by different synchronization primitives, and among the constraints imposed by the combination of properties and primitives.

Regarding the lock removal strategy described herein, an acquisition history of a concurrent program can be particularly useful in two different respects. First, it can be used to identify the causality constraints or causality relations which are needed to preserve the behaviors of the concurrent program. In addition, once these causality constraints have been identified, the acquisition history can be used to precisely identify the lock statements and unlock statements in the concurrent program which enforce the identified causality constraints. After the lock and unlock statements that preserve the identified causality constraints have been identified, the appropriate locks can be identified for removal. More specifically, all lock and unlock statements which are needed to preserve the identified causality constraints are to be maintained, while all remaining locks are to be discarded. In this manner, redundant locks can be removed from a concurrent program.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
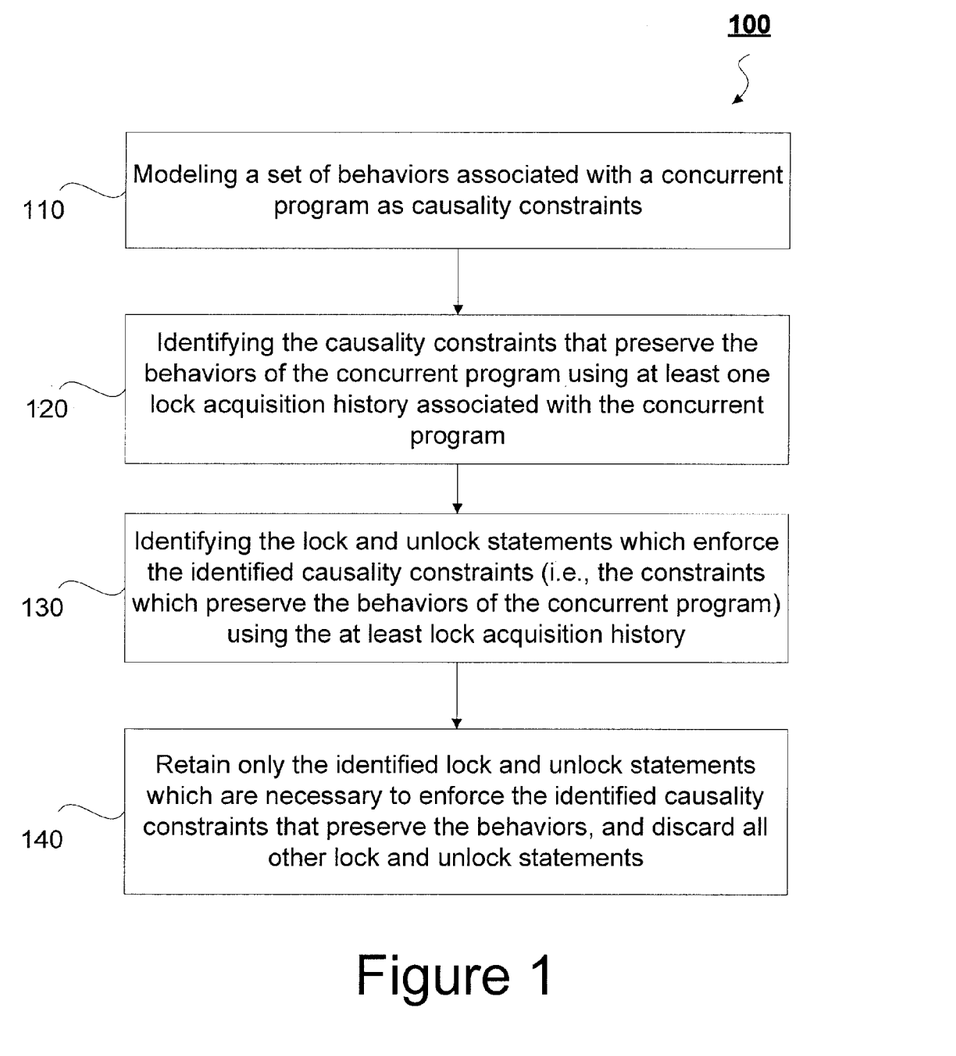
FIG. 1 is a block/flow diagram illustrating an exemplary method for removing locks in accordance with the present principles.

Referring now to the drawings in which like numerals represent the same or similar elements and initially to FIG. 1, a block/flow diagram illustratively depicts an exemplary method for removing locks in accordance with the present principles. The method begins in block 110 where a set of behaviors associated with a concurrent program are modeled as a set of causality constraints (also referred to herein as "happens-before" constraints). These causality constraints, or happens-before constraints, indicate all of the possible interleavings among the threads which are feasible under the scheduling constraints imposed by the synchronization primitives (e.g., mutexes, shared/exclusive locks, and semaphores) set forth in the concurrent program.

Having modeled the concurrent program as a set of causality constraints, the method then identifies the causality constraints which are key in preserving the behaviors of the program (block 120). This may involve identifying each visible state d which is not reachable from at least one other visible state c, and then identifying the constraint(s) which prevents c from reaching d.

To this end, a sufficiency condition may initially be formulated that guarantees behavior preservation during lock removal, i.e., which guarantees that $O(x^1, \ldots, x^n) = O(y^1, \ldots, y^n)$, where $y^i$ is the trace of thread $T_i$ resulting from $x^i$ via lock removal. Theorem 1, which is defined below, represents an exemplary sufficiency condition which guarantees behavior preservation.

Once a sufficiency condition is generated which guarantees that the behaviors of a program are preserved, the sufficiency condition should be implemented in an efficient manner. To accomplish this, two key bottlenecks must be overcome. The first bottleneck stems from the fact that the number of potential visible control states is exponential in the size of the program. The second bottleneck stems from the fact that establishing static reachability between the relevant pairs of visible control states generally involves constructing the product of the traces associated with the different threads, which tends to be computationally expensive.

The two bottlenecks described above can be bypassed using acquisition histories. Acquisition histories permit the reachability between global control states to be decided efficiently by tracking lock access patterns locally in each individual thread. This avoids the computationally expensive product construction associated with deciding static reachability in threads with non-nested locks. Rather than determining whether the successors of each visible state are preserved during lock removal (which can be computationally expensive), the acquisition histories can be used to enforce the requirement that a visible state d which is not reachable from another visible state c in the original program remains so in the transformed program.

More specifically, for each pair of visible states (c,d) such that d is not reachable from c, acquisition histories are utilized to precisely isolate the constraints that prevent d being reachable from c, and thus determine which constraints preserve the behavior of the program. In the case where no locks are held by any thread in c, forward acquisition histories (fah) can be used to decide static reachability. Alternatively, when no lock is held by any thread in d, backward acquisitions histories (bah) are employed to decide static reachability. The concepts of forward and backward acquisition histories is described in further detail below with reference to FIGS. 3A-3C.

After the acquisition histories are used to identify those constraints that preserve the behaviors of the program, the corresponding lock and unlock statements which enforce these constraints are identified (block 130). The aforementioned acquisition histories can also be used to locate and identify the lock and unlock which enforce the constraints identified in block 120 (i.e., the constraints which preserve the behavior of the program). This may involve iterating through each of the constraints identified in block 120, and identifying any lock and unlock statements which enforce these constraints.

Upon identifying the lock and unlock statements which preserve the behaviors of the program, only the lock and unlock statements which preserve the behaviors of the program are retained (block 140). All other lock and unlock statements are discarded. In this manner, redundant locks can be removed from a concurrent program.

Figure 2:
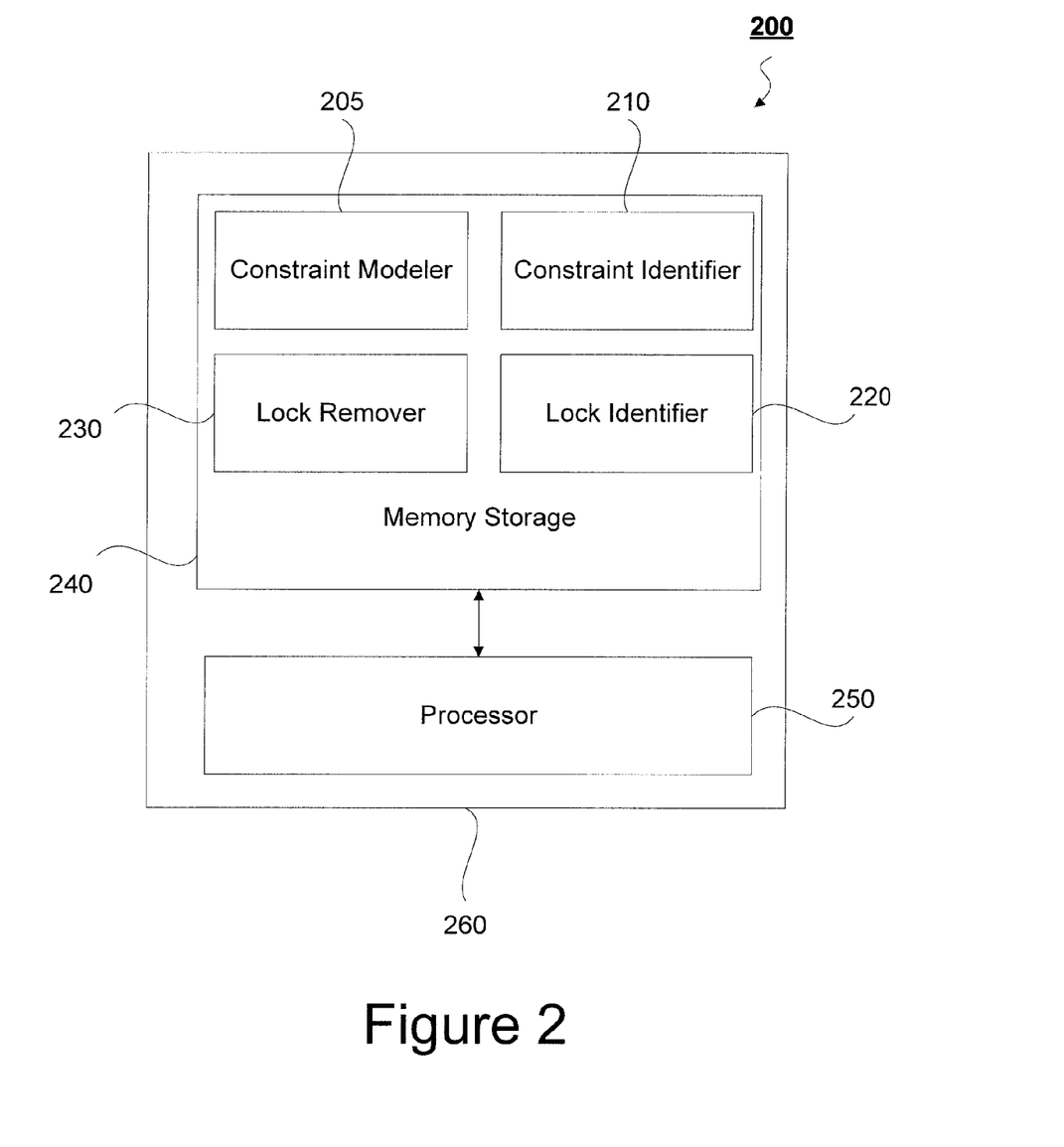
FIG. 2 is a block/flow diagram illustrating an exemplary system for removing locks in accordance with the present principles.

Moving on to FIG. 2, a block flow diagram illustratively depicts an exemplary system 200 for removing locks in accordance with the present principles. The exemplary system disclosed in this figure is capable of carrying out the method of FIG. 1 described above. The lock removal system 260 includes memory storage 240 (e.g., RAM, ROM, etc.) for storing data and processor 250 for executing instructions which may be stored in the memory 240. A constraint modeler 205, constraint identifier 210, lock identifier 220 and lock remover 230 are all stored on memory 240 in this particular embodiment. However, it should be recognized that one or more these components may be implemented using hardware in alternative embodiments.

As shown therein, a constraint modeler 205 models a set of behaviors associated with a concurrent program as causality constraints which indicate possible interleavings among the threads of the program which are feasible under the scheduling constraints imposed by the synchronization primitives (e.g., mutexes, shared/exclusive locks, and semaphores) set forth in the concurrent program.

The constraint identifier 210 identifies those constraints which preserve the behaviors of the concurrent program. This may be accomplished by identifying each visible state d which is not reachable from at least one other visible state c, and then using the acquisition history of the program to identify the constraint(s) which prevents c from reaching d.

Having identified the constraints which preserve the behaviors of the concurrent program, the lock identifier 220 determines which locks in the program are used to enforce the constraints. This may involve using the acquisition history to locate and identify the lock and unlock statements which correspond to the identified constraints which effectively preserve the behavior of the program.

The lock remover 230 is responsible for removing the redundant locks in the concurrent program, and may also be responsible for outputting a transformed program in which all rendundant locks have been removed. The lock remover 230 retains all locks in the program that are needed to enforce the identified constraints, and thus preserve the behaviors of the program. On the other hand, if additional locks are present in the program which are not needed to preserve the behavior of the program, the lock remover 230 will discard these locks. In certain embodiments, the locks which are to be removed are converted to, or replaced with, skip statements.

As mentioned above, a goal of the lock removal strategy is to remove locks in a way so as not to introduce more behaviors, i.e., make more partial orders feasible. To accomplish such, the lock removal strategy adheres to a sufficiency condition which guarantees that the behavior of a program is preserved during lock removal, i.e., which guarantees $O(x^1, \ldots, x^n) = O(y^1, \ldots, y^n)$, where $y^i$ is the trace of thread $T_i$ received from $x^i$ via lock removal. This sufficiency condition is embodied in the following theorem:

Theorem 1 (Behavior Preservation Theorem): Let concurrent program $\mathcal{P}$ result from $\mathcal{P}'$ via lock removal. Then, if for each visible control state c of $\mathcal{P}$ (and also of $\mathcal{P}'$) $Succ_{\mathcal{P}}(c) = Succ_{\mathcal{P}'}(c)$, then for each n-tuple $x^1, \ldots, x^n$ of local computations of $T_1, \ldots, T_n$, respectively, $O_{\mathcal{P}}(x^1, \ldots, x^n) = OO_{\mathcal{P}'}(x^1, \ldots, x^n)$.

This theorem provides a static sufficiency check for behavior preservation which can be turned into a practical lock removal procedure as explained below. However, to apply this theorem the following concepts are defined:

Definition of Lock Removal: A concurrent program $\mathcal{P}'$ results from another concurrent program $\mathcal{P}$ via lock removal if $\mathcal{P}$ is obtained from $\mathcal{P}'$ by converting some of the lock acquisition and their matching lock release statements to skip statements.

Definition of Global Control State: For a concurrent program $\mathcal{P}$ comprised of the n-threads $T_1, \ldots, T_n$, a global control state of $\mathcal{P}$ is an n-tuple of the form $(c_1, \ldots, c_n)$ where $c_i$ is a control location (statement) of thread $T_i$.

Note that one distinction between a global control state and the standard notion of a global state of a concurrent program is that in a global control state, only the values of the program counters of the threads are tracked while the remaining program variables are ignored.

Definition of Visible Global Control State: A global control state $(c_1, \ldots, c_n)$ is said to be visible if for each $i \in [1, \ldots, n]$, $c_i$ is either a shared variable access or a lock acquisition statement (by default the initial state is treated as a shared variable access).

Executing the sub-sequence of transitions along $y^j$ causes the concurrent program $\mathcal{P}$ to transit from one visible global control state $(c_1, \ldots, c_n)$ to another visible global control state $d_1, \ldots, d_n)$ via a computation path z such that the only possible transition with a shared variable access fired along z is the first one.

Definition of Visible Successors: Given a visible control state $(c_1, \ldots, c_n)$ of a concurrent program $\mathcal{P}$, the visible successors of $(c_1, \ldots, c_n)$ is the set of visible control states of the form $(d_1, \ldots, d_n)$ such that there exist global states c and d of $\mathcal{P}$ where (i) $(c_1, \ldots, c_n)$ and $(d_1, \ldots, d_n)$ are the global control states of $\mathcal{P}$ in c and d, respectively, and (ii) there exists a valid computation x of $\mathcal{P}$ from c to d such that possibly the only transition with a shared variable access fired along x is the first one.

Preserving the set of visible successors of each visible control state of concurrent program during lock removal suffices to preserve the set of the behaviors of the concurrent program. However, the notion of visible successors as defined above is inherently a semantic one since the above definition of condition (ii) (see above) involves checking the reachability of global state d of $\mathcal{P}$ from c. Semantic conditions are expensive to establish since they involve reasoning about program variables. Thus, the present principles provide a static check which is efficient and which guarantees the preservation of program behavior. To apply this static check, the notions of "static reachability" and "static visible successors" are defined.

Definition of Static Reachability: A global control location $(d_1, \ldots, d_n)$ is statically reachable from another global control location $(c_1, \ldots, c_n)$ via local paths $x^i$ of $T_i$ leading from $c_i$ to $d_i$ from $c_2$ to $d_2$, respectively, if there exists an interleaving of $(x_1, \ldots, x_n)$ that satisfies the scheduling constraints imposed by synchronization and fork/join primitives only (while ignoring data).

Definition of Static Visible Successors: Given a visible control state $(c_1, \ldots, c_n)$ of a concurrent program $\mathcal{P}$, the visible successors of $(c_1, \ldots, c_n)$, denoted by $Succ_{q^*}((c_1, \ldots, c_n))$, is the set of visible control states of the form $(d_1, \ldots, d_n)$ such that for each i, $(d_1, \ldots, d_n)$ is statically reachable from $(c_1, \ldots, c_n)$ via local computations $x_i$ of threads $T_i$ such that at most one shared variable access occurs along $x_1, \ldots, x_n$.

The static check described above for behavior preservation is encoded in Theorem 1. Hence, Theorem 1 provides a sufficiency check for preserving program behavior during lock removal. However, application of this theorem inherently involves establishing that the successors of every visible control state are the same in the original and the transformed program. Consequently, this presents two key bottlenecks as mentioned above.

This first bottleneck stems from the fact that the number of potential visible control states is exponential in the size of the program. The second bottleneck stems from the fact that establishing static reachability between the relevant pairs of visible control states generally involves constructing the product of the traces associated with the different threads, which tends to be computationally expensive.

To avoid these bottlenecks associated with establishing reachability, the lock removal strategy takes advantage of the fact that the static reachability of concurrent programs with nested locks can be decided in an efficient manner using "thread local reasoning". This is accomplished using the aforementioned acquisition histories. To this end, a formal definition of "nested locks" is provided.

Definition of Nested Locks: A concurrent program accesses locks in a nested fashion if along each computation of the program a thread can only release the last lock that it acquired along that computation and that has not yet been released.

In most real-world concurrent programs, locks are accessed by threads in a nested fashion. In fact, standard programming practice guidelines typically recommend that programs use locks in a nested fashion. In languages like C++, locks are guaranteed to be nested. As mentioned above, static reachability can decided efficiently for concurrent programs with nested locks via the notion of acquisition histories.

An advantageous feature of the acquisition history technique relates to the fact that it is compositional in nature in the sense that the acquisition histories permit the reachability between global control states to be decided by tracking lock access patterns locally in each individual thread. This avoids the computationally expensive product construction required for deciding static reachability in threads with non-nested locks.

The concepts of backward and forward acquisition histories can be used to efficiently decide static reachability of global control state d from global control state c of $\mathcal{P}$. Specifically, forward acquisition histories can be used to decide reachability in the case where no locks are held by any thread in c, whereas backward acquisition histories can be used to determine reachability when no lock is held by any thread in d.

Definition of Backward Acquisition History: For a lock l held by thread T at local state c, the backward acquisition history (bah) of l along a local computation x of T leading from local states c to d, denoted by bah(T, c, l, x), is the set of locks that were released (and possibly acquired) by T since the last release of l by $\mathcal{P}$ in traversing backwards along x from d to c.

As an example, let $x^i$ be a local computation of $T_i$ leading from control locations $c_i$ to $d_i$. It can be observed that bah($T_1$, $c_1$,p,$x^i$)={q} whereas bah($T_2$,$d_1$,q,$x^2$)={p,r}. Since p∈bah($T_2$, $d_1$,q,$x^2$) and q=bah($T_1$,$c_1$,p,$x^1$), there is a cyclic dependency wherein p belongs to the forward acquisition history of q, and vice versa, which prevents ($c_2$,$d_2$) from being statically reachable from ($c_1$,$d_1$).

Forward acquisition histories are essentially the opposite of backward acquisition histories and are used to decide whether a global control location d is reachable from a global control location c wherein no lock is held by any thread.

Definition of Forward Acquisition History: For a lock l held by thread T at a control location d, the forward acquisition history (fah) of l along a local computation x of T leading from c to d, denoted by fah(T, c, l, x), is the set of locks that have been acquired (and possibly released) by T since the last acquisition of l by T in traversing forward along x from c to d.

By combining the notion of backward and forward acquisition histories, a sufficient condition can be provided for deciding static reachability of d from c, where c and d are arbitrary control states of $\mathcal{P}$.

Theorem 2 (Decomposition Result Theorem): Let $\mathcal{P}$ be a concurrent program comprised of threads $T_1$ and $T_2$ with nested locks. Then, a global control state d=($d_1$,$d_2$) of $\mathcal{P}$ is reachable from another global control state $(c_1, c_2)$ if and only if for each i, there exists a local computation $x^i$ of $T_i$ from $c_i$ to $d_i$, such that 1. Lock-Set$(T_1,c_1) \cap$ Lock-Set$(T_2,c_2)=\phi$, where Lock-Set $(T_i,c_i)$ is the set of locks held at control location $c_i$ of $T_i$.
2. Lock-Set$(T_1,d_1) \cap$ Lock-Set$(T_2,d_2)=\phi$
3. Locks-Acq$(x^1) \cap$ Locks-Held$(x^2)=\phi$ and Locks-Acq$(x^2) \cap$ Locks-Held$(x^1)=\phi$ where for path $x^i$, Locks-Acq$(x^i)$ is the set of locks that are acquired (and possibly released) along $x^i$ and Locks-Held $(x^i)$ is the set of locks that are held in all states along $x^i$,
4. there does not exist locks l=Lock-Set$(T_1,c_1)$ and l'=Lock-Set$(T_2,c_2)$ such that l=bah$(T_2,c_2,l',x^2)$ and l'=bah$(T_1,c_1,l,x^1)$, and
5. there do not exist locks l=Lock-Set$(T_1,d_1)$ and l'=Lock-Set$(T_2,d_2)$ such that l=fah$(T_2,c_2,l',x^2)$ and l'=fah$(T_1,c_1,l,x^1)$.

Intuitively, conditions 1 and 2 ensure that the locks held by $T_1$ and $T_2$ in a global configuration of $\mathcal{P}$ must be disjoint. Condition 3 ensures that if a lock held by a thread, e.g., $T_1$, is not released along the entire local computation $x^1$, then it cannot be acquired by the other thread $T_2$ all along its local computation $x^2$, and vice versa. Conditions 4 and 5 ensure compatibility of the acquisition histories, i.e., the absence of cyclic dependencies as discussed above.

If d=$(d_1,d_2)$ is not reachable from c=$(c_1,c_2)$, then at least one of the conditions in the statement of the decomposition result is violated. This allows us to isolate the root causes that prevent d=$(d_1,d_2)$ from being reached from c=$(c_1,c_2)$. The motivation for identifying these root causes is that if a visible control state $(c_1, c_2)$ is not statically reachable from another visible control state $(d_1,d_2)$ in the original program, then it needs to be confirmed that $(d_1,d_2)$ is not reachable from $(c_1,c_2)$ in the transformed program also. Thus, some, but not all, of the locks that prevent $(d_1,d_2)$ being reachable from $(c_1,c_2)$ should be maintained during lock removal.

In order for $(d_1,d_2)$ to not be reachable from $(c_1,c_2)$, at least one of the conditions in the Theorem 2 must be violated. Then, the pair (c,d) is associated with a set of locksets (i.e., sets of locks), denoted by RB(c,d), that are referred to as "reachability barriers" (RB) from c to d. RB(c,d) is defined to be the set of all locksets L such that at least one of the following holds:

(1) L={l}, where l∈Lock-Set$(T_1,c_1) \cap$ Lock-Set$(T_2,c_2)$,
(2) L={l}, where l∈Lock-Set$(T_1,d_1) \cap$ Lock-Set$(T_2,d_2)$,
(3) L={l}, where l is held throughout $x^1(x^2)$ and is acquired along $x^2(x^1)$,
(4) L={l,l'}, where l∈Lock-Set$(T_1,c_1)$ and l'∈Lock-Set$(T_2,c_2)$ such that l∈bah$(T_2,c_2,l',x^2)$ and l'∈bah$(T_1,c_1,l,x^1)$, or
(5) L={l,l'}, where l∈Lock-Set$(T_1, d_1)$ and l'∈Lock-Set$(T_2, d_2)$ such that l∈fah$(T_2,d_2,l',x^2)$ and l'∈fah$(T_1,d_1,l,x^1)$.

Note that in order to ensure that d remains unreachable from c, it suffices to retain the locks belonging to some lockset in RB(c,d). To apply Theorem 2, lock access patterns are locally tracked, thus allowing the conditions of Theorem 2 to be checked. Accordingly, for control locations $c_i$ and $d_i$ of thread $T_i$, the "lock access pattern" (LAP) can be defined from $c_i$ to $d_i$ along a computation $x_i$ of $T_i$ starting at $c_i$ and ending at $d_i$, denoted by LAP$_{x_i}(c_i,d_i)$, as the tuple ($L_1,L_2$,bah,fah,Held, Acq), where $L_1$ and $L_2$ are the set of locks held at $c_i$ and $d_i$, respectively, Held is the set of locks that are held in all states occurring along $x_i$, Acq is the set of locks that are acquired along $x_i$, and bah and fah are the backward and forward acquisition histories at $c_i$ and $d_i$ along $x_i$. It can be said that LAP$_{x_1}(c_1,d_1)$=($L_1^1,L_2^2$,bah$^1$,fah$^1$,Held$^1$,Acq$^1$) and LAP$_{x_2}(c_2,d_2)$=($L_1^2,L_2^2$,bah$^2$,fah$^2$,Held$^2$,Acq$^2$) are "consistent" if (I) for i≠i', $L_1^i \cap L_1^{i'}=\phi$ and $L_2^i \cap L_2^{i'}=\phi$, (II) there do not exists locks l and l' such that l belongs to the forward acquisiton history of l' in fah$^1$ and l' to the forward acquisition history of l in fah$^2$, (III) there does not exist locks l and l' such that l belongs to the backward acquisition history of l' in bah$^1$ and l' to the backward acquisition history of l in bah$^2$, and (IV) for i≠i', Acq$^i \cap$ Held$^{i'}=\phi$. Then, the decomposition result can be restated as follows:

Corollary 1 (Consistency Result): Let $x^i$ be a local computation of $T_i$ leading from $c_i$ to $d_i$. Then, $(d_1,d_2)$ is statically reachable from $(c_1,c_2)$ via an interleaving of $x^1$ and $x^2$ if and only if LAP$_{x_1}(c_1,d_1)$ and LAP$_{x_2}(c_2,d_2)$ are consistent.

According to the behavior preservation theorem (Theorem 1), it must be ensured that for each visible control state c, Succ$_\mathcal{P}(c)$=Succ$_{\mathcal{P}'}(c)$ to preserve program behavior. However, since the number of visible control states may be exponential in the size of the program, it is computationally infeasible to enumerate all possible visible pairs and their successors.

Instead, acquisition histories permit reachability to be decided via local reasoning without explicitly enumerating all pairs of visible control states (c,d), where d is reachable from c. Towards that end, consider the dual problem associated with the set of visible control states that are not reachable from c due to scheduling constraints imposed by synchronization primitives in the original program. According to Theorem 1, it suffices to make sure that these visible states cannot be successors of c in $\mathcal{P}'$ either. This is accomplished by retaining for each pair of visible global control states (c,d), where d is not statically reachable from c, some of the locks in RB(c,d), i.e., those that prevent d from being reachable from c.

Thus, broadly speaking, our lock removal strategy is as follows:

Lock Removal Strategy: For each pair of visible global control states c and d such that d is not statically reachable from c, retain some of the locks that prevent d being reachable from c.

To implement the above strategy in a scalable fashion, the strategy avoids explicitly enumerating all pairs of visible control states (c,d) and checking whether d is not statically reachable from c. Instead, the strategy proceeds as follows:

1. To check reachability of global control state d=$(d_1,d_2)$ from c=$(c_1,c_2)$, it suffices to check that $d_i$ is locally reachable from $c_i$ via a path $x^i$ such that the lock access patterns along $x^1$ and $x^2$ are consistent (see corollary). Thus, all the strategy only has to traverse for each i, the local path $x^i$ once to compute the lock access pattern from $c_i$ to $d_i$.

2. The lock access patterns need to be tracked between all pairs of local states $c_i$ and $d_i$ for each pair of visible control states c=$(c_1,c_2)$ and d=$(d_1,d_2)$. Here, the static reachability of d from c is checked. Thus, for each thread $T_i$, all such pairs of local control states $(c_i,d_i)$ of interest are enumerated. These pairs of interest are implicitly encoded in Theorem 1 according to which the test static reachability between visible states of the form c=$(c_1,c_2)$ and d=$(d_1,d_2)$ is tested, such that there is a path from c to d along which there is no shared variable accesses except possibly $c_i$ and $d_i$. This implies that lock access patterns are tracked for pairs of the form $(c_i,d_i)$, where $c_i$ and $d_i$ are control locations of $T_i$ with $d_i$ occurring after $c_i$ along $x^i$, such that (1) $c_i$ and $d_i$ are either initial states of $T_i$, or locations associated with either a lock acquisition or a shared variable access, and (2) there exists no shared variable access between $c_i$ and $d_i$ along $x^i$ other than $c_i$ or $d_i$. The set of all such pairs of interest along $x^i$ are denoted by POI($x^i$).

3. Next, for each thread $T_i$, its trace $x^i$ is traversed to compute the lock access pattern LAP$_{x^i}(c_i,d_i)$, where $(c_i,d_i)$ $\epsilon POI(x^i)$. Additionally, a function ap is built from the set of lock access patterns encountered along the traces $x^i$ to pairs of interest. This function serves to map each lock access pattern p encountered along $x^i$ to the set of all pairs of interest $(c_i, d_i) \epsilon POI(x^i)$ such that $LAP_{x^i}(c_i, d_i) = p$. Let LP be the set of lock access patterns encountered for all the pairs of interest along the traces $x^i$.

4. The access pattern map ap can be used to avoid the state explosion problem. Instead of iterating through the set of all visible control states and computing the visible states c which are not reachable from d, all of the pairs (c,d) are directly enumerated such that $d = (d_1, d_2)$ is not statically reachable from $c = (c_1, c_2)$. Towards that end, consider all pairs of lock acquisition patterns $(p_1, p_2)$, where $p_1, p_2 \epsilon LP$ and $p_1$ and $p_2$ are inconsistent (see the definition of a lock access pattern). Then, for any pairs of interest $(c_1, d_1) \epsilon ap()$ and $(c_2, d_2) \epsilon ap()$, there are corresponding inconsistent acquisition histories, i.e., $p_1$ and $p_2$, respectively. Thus, according to Corollary 1, $(d_1, d_2)$ is not statically reachable from $(c_1, c_2)$. In other words, acquisition histories the set of non-reachable pairs of visible control states to be directly isolated without enumerating all pairs of visible global states.

5. Let NR be the set of all pairs (c,d) such that d is not statically reachable from c. Then, each pair $p = (c,d) \epsilon NR$, the different sets of locks can be isolated which may prevent d from being statically reachable from c. Recall that a goal of our lock removal procedure is to ensure that d is not statically reachable from c in the transformed program. If $RB(c,d) = \{L_1, \ldots, L_m\}$, then to prevent d from being reachable from c it suffices to maintain only a small subset L of locks where for some $i, L_i \subseteq L$.

6. At this point, all that needs to be done is to identify a subset L of locks such that for each pair $(c,d) \epsilon NR$, d is statically unreachable from c. Let $NR = \{(c_1, d_1), \ldots, (c_m, d_m)\}$ and let $RB(c_i, d_i) = \{L_{i1}, \ldots L_{im_i}\}$. Then, pick a subset L of locks that form a disjunctive cover for each of the sets $RB(c_i, d_i)$, i.e., for each i, there exists $j \epsilon [1 \ldots m_i]$ such that $L_{ij} \subseteq L$. This can be accomplished via a simple greedy strategy.

Figure 3A:
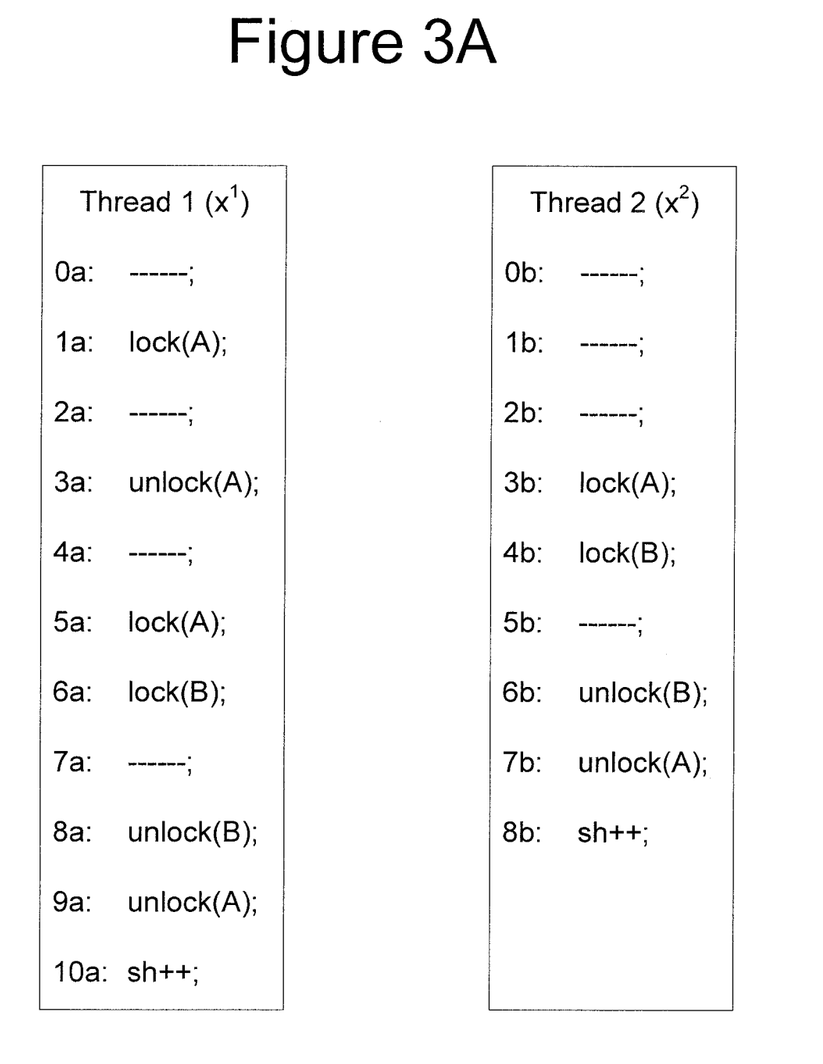
FIG. 3A is a trace of two threads in an exemplary concurrent program.
Figure 3B:
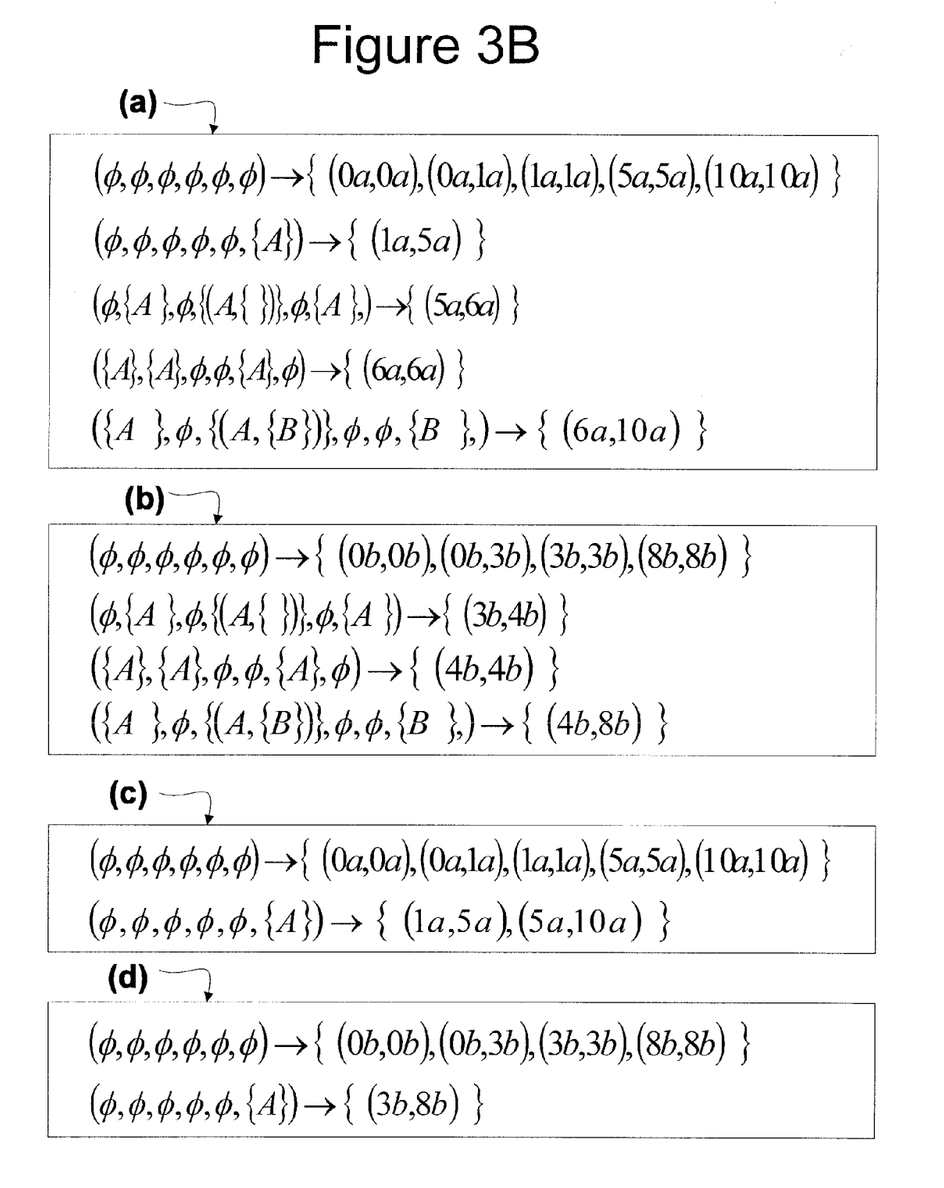
FIG. 3B is an ap function derived from the trace of the two threads disclosed in FIG. 3A.
Figure 3C:
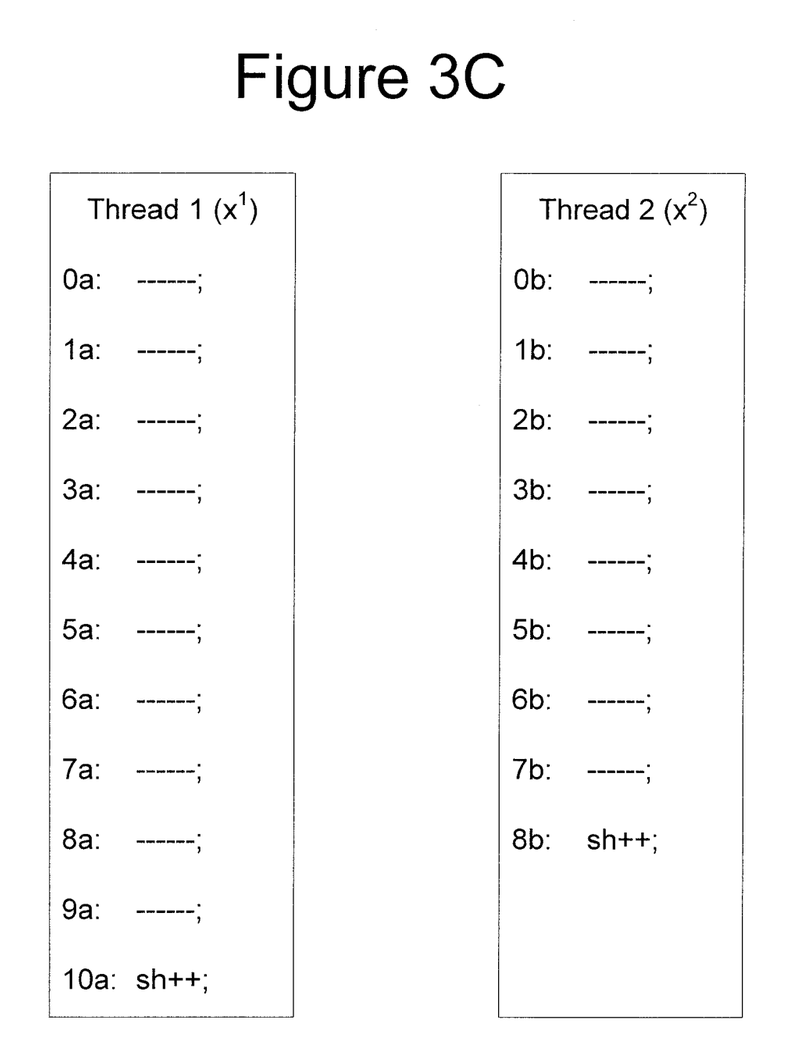
FIG. 3C is a resulting trace of the two threads in FIG. 3A after application of the present lock removal scheme.

An example of applying the above procedure is now provided with reference to FIGS. 3A, 3B and 3C. FIG. 3A is a trace of two threads, $x^1$ and $x^2$, in an exemplary concurrent program. The example below describes how all locks in these traces can be removed while preserving the behavior of the program.

The procedure begins by identifying the pairs of interest (POI) and constructing the ap functions for each trace. The ap functions for the traces of $x^1$ and $x^2$ are disclosed in FIG. 3B. More specifically, sections (a) and (c) of FIG. 3B represent the ap function for $x^1$, while sections (b) and (d) represent the ap function for $x^2$.

In the trace $x^1$, there are two shared variable accesses, i.e., 0a and 10a (the initial state is always treated as a shared variable access) and three lock acquisition statements, i.e., 1a, 5a and 6a. This leads to the pairs of interest $POI(x^1) = \{(0a, 0a), (0a, 1a), (1a, 1a), (1a, 5a), (5a, 5a), (5a, 6a), (6a, 6a), (6a, 10a)\}$. Similarly, $POI(x^2) = \{(0b, 0b), (0b, 3b), (3b, 3b), (3b, 4b), (4b, 4b), (4b, 8b), (8b, 8b)\}$.

The ap function for $x^2$ is then computed. For each state (c2, d2) in the set $\{(0b, 0b), (0b, 3b), (3b, 3b), (8b, 8b)\}$ no lock is held at either $c_2$ or $d_2$ and no lock is acquired along the subsequence of $x^2$ from $c_2$ to $d_2$. Thus, all the entries in the lock access pattern tuples for these pairs are empty (note that if a thread is at location 3b it means that the statement at 3b has not been executed yet, i.e., lockset at location 3b is Ø).

Consider now the pair of interest (4b, 8b). Let $y^2$ be the subsequence of $x^2$ leading from 4b to 8b. It can be shown that $LAP_{y^2}((4b, 8b)) = (\{A\}, Ø, \{(A, \{B\})\}, Ø, Ø, \{B\})$. The first two entries in the tuple are the locksets held at 4b and 8b which are $\{A\}$ and Ø, respectively. Since no lock is held at the final state 8b, the forward acquisition history, i.e., the fourth entry of the tuple is empty. On the other hand, lock A is held at the initial state 4b. This lock is released at 7b. However, before it is released, $x^2$ also releases B at 6b. Thus, B is in the backward acquisition history of A which is reflected in the third entry of the tuple. Also, since lock B is acquired at location 4b along $y^2$, then $Acq = \{B\}$ (sixth entry). There exists no lock that is held at all states along $y^2$. Thus, $Held = Ø$ (fifth entry). Similarly, we may compute the lock access patterns for other pairs of interest.

The ap function for $x^1$ can be computed in a similar fashion (see section (a) of FIG. 3B). From sections (a) and (b) of FIG. 3B, it can be seen that the inconsistent pairs of lock access patterns are (p1, p2), where:
1. $p^1 = ((\{A\}, \{A\}, Ø, Ø, \{A\}, Ø), p^2 = (Ø, \{A\}, Ø, \{(A, \{\})\}, Ø, \{A\}))$: Held and Acq fields of $p^1$ and $p^2$, respectively, have the common lock A;
2. $p^1 = ((Ø, Ø, Ø, Ø, Ø, \{A\})$ and $p^2 = (\{A\}, \{A\}, Ø, Ø, \{A\}, Ø))$: Acq and Held fields of $p^1$ and $p^2$, respectively, have the common lock A;
3. $p^1 = ((Ø, \{A\}, Ø, \{(A, \{\})\}, Ø, \{A\})$ and $p^2 = (\{A\}, \{A\}, Ø, Ø, \{A\}, Ø))$: Acq and Held fields of $p^1$ and $p^2$, respectively, have the common lock A;
4. $p^1 = ((\{A\}, \{A\}, Ø, Ø, \{A\}, Ø)$ and $p^2 = (\{A\}, \{A\}, Ø, Ø, \{A\}, Ø))$: L1 fields have the common lock A;
5. $p^1 = ((\{A\}, \{A\}, Ø, Ø, \{A\}, Ø)$ and $p^2 = (\{A\}, Ø, \{(A, \{B\})\}, Ø, Ø, \{B\}))$: L1 fields have the common lock A;
6. $p^1 = ((\{A\}, Ø, \{(A, \{B\})\}, Ø, Ø, \{B\})$ and $p^2 = (\{A\}, \{A\}, Ø, Ø, \{A\}, Ø))$: L1 fields have the common lock A;
7. $p^1 = ((\{A\}, Ø, \{(A, \{B\})\}, Ø, Ø, \{B\})$ and $p^2 = (\{A\}, Ø, \{(A, \{B\})\}, Ø, Ø, \{B\}))$: L1 fields have the common lock A; and
8. $p^1 = (Ø, \{A\}, Ø, \{(A, \{\})\}, Ø, \{A\})$ and $p^2 = (Ø, \{A\}, Ø, \{(A, Ø)\{\})\}, Ø, \{A\}$ L2 fields have the common lock A.

Note that in each of the above cases the only lock which occurs in the reachability barriers of the non-reachable pairs of visible control states that these inconsistent lock patterns induce is A. Thus, the disjunctive cover for each of these pairs of visible control states is comprised of the set $\{A\}$. Since lock B does not occur in any of the disjunctive covers, all statements locking/unlocking B are removed in the first iteration.

Now, the lock removal procedure is repeated again on the traces disclosed in FIG. 3A by converting statements 6a, 8a, 4b and 6b to skip statements. These new traces generate the ap functions shown in sections (c) and (d) of FIG. 3B. Now all pairs of access patterns are mutually consistent. Thus, the reachability barriers for all pairs of visible control states are empty. Hence, all locks in the traces shown can now be removed resulting in the traces shown in FIG. 3C with no lock statements. The above described procedure can also be implemented using Pseudocode Example 1 provided below.

PSEUDOCODE EXAMPLE 1

Lock Removal

1:    Input: local computations $x^1$ and $x^2$ of threads $T_1$ and $T_2$
2:    for each local computation $x_i$ do
3:       Traverse $x^i$ and compute the lock access pattern $AP_{x^i}(c_j, d_j)$ for each pair
$(c_j, d_j) \in POI(x^i)$. Also, compute the set LP of different access patterns encountered and build the lock access pattern map ap.

-continued

```
4:     end for
5:     for every pair p₁,p₂ of inconsistent lock access patterns in LP
       do
6:        for each pair of interest (c₁,d₁) ∈ ap(p₁) and (c₂,d₂) ∈ ap(p₂)
          do
7:           if c₁ and c₂ may happen in parallel with d1 and d2 then
8:              Compute RB ((c₁,d₁),(c₂,d₂))
9:           end if
10:       end for
11:    end for
12:    Compute disjunctive cover L for all the reachability barriers
       computed in step 8.
13:    Remove all locks in the program that do not occur in L.
```

So far, the above-described lock removal strategy has assumed that the only synchronization primitives used along the traces $x^1$ and $x^2$ are locks. However, a concurrent program may include fork/join primitives for thread creation and destruction, as well as send/wait primitives which induce happens-before constraints. Therefore, wait/notify and fork/join-induced causalities are incorporated into the lock removal strategy.

The constraints associated with the fork/join and send/wait primitives do not affect the overall lock removal procedure. The causalities induced by these primitives only affect how the condition specified at step 7 in the Pseudocode Example 1 is evaluated. In determining whether $c_1$ may happen in parallel with $c_2$, the lock removal scheme exploits the wait/notify and fork/join induced causalities in addition to mutual exclusion constraints imposed by locks.

To incorporate send/wait induced constraints, a check is performed to determine whether there exists a pair of matching wait/send statements w and n along $x^1$ and $x^2$, respectively, such that $c_1$ occurs before n along $x^1$, and $c_2$ occurs after w along $x^2$, or vice versa. If that is the case, then $c_1$ and $c_2$ cannot happen in parallel. However, if this is not the case, $c_1$ and $c_2$ can operate in parallel.

Similarly, for control locations $c_1$ and $c_2$ for two different threads to execute in parallel, $c_1$ must lie between the fork and join statements of a thread $T_2$, where $c_2$ is executed either by $T_2$ or threads forked thereof, and vice versa.

Note that these checks are not carried out for each pair $(c_1,c_2)$. Rather, the may-happens in parallel analysis is carried out once in the beginning and the may-happens-in-parallel tuples are logged. This information can be used on demand.

Pseudocode Example 1 can be generalized to programs with an arbitrary number of threads in a straight-forward manner. The only difference from the 2-thread case is that an efficient technique is needed to decide static reachability between visible control states which are now n-tuples of the form $(c_1, \ldots, c_n)$, where each $c_i$ is either shared variable access or a lock acquisition statement. This is achieved via the following simple extension of the decomposition result to programs with n threads.

Theorem 3 (Decomposition Result Extended): Let $\mathcal{P}$ be a concurrent program comprised of the n threads $T_1, \ldots, T_n$ with nested locks. Then, global control state $d=(d_1,\ldots,d_n)$ of $\mathcal{P}$ is reachable from another global control state $c=(c_1, \ldots, c_n)$ if, and only if, for each $i \in [1 \ldots n]$, $d_i$ is reachable from $c_i$ via a local computation path $x^i$ of $T_i$ such that:

1. For each $i \neq j$, Lock–Set$(T_i,c_i) \cap$ Lock–Set$(T_j,c_j)=\phi$
2. For each $i \neq j$, Lock–Set$(T_i,d_i) \cap$ Lock–Set$(T_j,d_j)=\phi$
3. Each lock l that is held throughout $x^i$, for some i, is not acquired along $x^j$, where $j \neq i$.
4. There does not exist $i_1, \ldots, i_k \in [1 \ldots n]$ and locks $l_{j_1}, \ldots, l_{j_k}$ such that for each j, lock $l_{i_k} \in$ Lock–Set$(T_{i_j}, c_{i_j})$ and $l_{i_j} \in$ fah $(T_{i_{j+1}}, c_{i_{j+1}}, l_{i_{j+1}}, x^{i_{j+1}})$ and $l_{i_k} \in$ fah$(T_{i_1}, c_{i_1}, l_{i_1}, x^{i_1})$.
5. There does not exist $i_1, \ldots, i_k \in [1 \ldots n]$ and locks $l_{j_1}, \ldots, l_{j_k}$ such that for each j, lock $l_{i_j} \in$ Lock–Set$(T_{i_j}, c_{i_j})$ and $l_{i_j} \in$ bah $(T_{i_{j+1}}, c_{i_{j+1}}, l_{i_{j+1}}, x^{i_{j+1}})$ and $l_{i_k} \in$ bah$(T_{i_1}, c_{i_1}, l_{i_1}, x^{i_1})$.

Conceptually, the only difference between the decomposition result for the 2-thread case and the n-thread case is in conditions 4 and 5, where the strategy accounts for the cases where for n-threads a cyclic dependency may span multiple threads instead of just two. Thus, in this case, a cyclic dependency could result from a set of locks $l_{i_1}, \ldots, l_{i_m}$ where for each j, $l_{i_j}$ belongs to the acquisition history of $l_{i_{j+1}}$ at $c_{i_{j+1}}$ and $l_{i_m}$ belongs to the acquisition history of $l_{i_1}$ and $c_{i_1}$.

The lock removal techniques discussed above can be extended to the general programs where each thread $T_i$ is specified in terms of its control flow graph $G_i$ instead of a trace. Conceptually, the extension is straightforward. The main lock removal procedure (e.g., as disclosed in Pseudocode Example 1) is essentially the same as before. However, the only difference lies in the computation of lock access patterns to determine reachability between pairs of visible global control states.

Suppose that the lock removal strategy is applied to decide whether $(d_1, d_2)$ is statically reachable from $(c_1, c_2)$. Unlike the case where each thread is specified as a trace, there could, in general, exist multiple paths (even infinitely many in the case of loops and recursion) from $c_i$ to $d_i$. Thus, a check needs to be implemented to determine whether there exists paths $x_i$ from $c_i$ and $d_i$ along which the lock access patterns are consistent. Hence, all possible lock access patterns are to be computed along all paths from $c_i$ to $d_i$. While the number of paths from $c_i$ to $d_i$ is infinite, the number of different lock access patterns in also bounded since the total number of locks in the given concurrent program is fixed. Hence, the different lock access patterns between locations $c_i$ and $d_i$ of thread T can be computed via a simple dataflow analysis over the control flow graph $G_i$.

The dataflow analysis involves a fixpoint algorithm to compute all possible lock access patterns along paths from $c_i$ to $d_i$. Recall that each access pattern tuple is of the form $(L_1, L_2, \text{fah}, \text{bah}, \text{Held}, \text{Acq})$, where $L_1$ is the set of locks held at $c_i$, $L_2$, the set of locks held at $d_i$, fah and bah are the forward and backward acquisition histories, for a local computation $x_i$ from $c_i$ to $d_i$ Held and Acq are the set of locks held through $x_i$ and acquired along $x_i$, respectively.

The procedure starts computing the set $\mathcal{L}(c_i)$ of possible locksets at $c_i$. This can be accomplished via standard techniques which exist in the art. This generates the dataflow tuples $(L, \phi, \phi, \phi, L, \phi)$, where $L \in \mathcal{L}$. Note that $L_2$, fah and bah are set to $\phi$ at the start. Each time a lock/unlock statement is encountered, the entries are updated to create a new tuple. If a release of a lock is encountered, then l is added to the backward acquisition history of each lock that was held initially and that has not yet been released, i.e., the set $L_1 \backslash L_2$. Similarly, if a lock acquisition statement is encountered, then the forward acquisition history of each lock that is currently held and which was not in the lockset of the start state, i.e., the set $L_2$, is updated.

Having described preferred embodiments of a system and method for removing locks from a concurrent program (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for removing locks from a concurrent program, comprising:
modeling a set of program behaviors associated with a concurrent program as causality constraints, wherein the set of program behaviors includes threads of the program which are feasible under the scheduling constraints imposed by the synchronization primitives set forth in the concurrent program, wherein the causality constraints are stored on a non-transitory computer readable storage medium;
identifying the causality constraints which preserve the behaviors of the concurrent program, wherein each visible state which is not reachable from at least one other visible state is identified by a constraint identifier, and wherein the causality constraints are embedded into a common framework; and
identifying lock and unlock statements in the concurrent program which enforce the identified causality constraints, wherein lock and unlock statements which are employed to preserve the identified causality constraints are maintained, and redundant locks are removed from the concurrent program.

2. The method of claim 1, further comprising retaining the lock and unlock statements which enforce the identified causality constraints, and discarding any remaining lock and unlock statements.

3. The method of claim 1, further comprising employing at least one lock acquisition history to isolate a subset of lock and unlock statements in the concurrent program that enforce the identified causality constraints which capture the set of behaviors associated with the concurrent program.

4. The method of claim 3, wherein employing at least one lock acquisition history includes determining reachability between global control states by tracking lock access patterns locally in each individual thread of the concurrent program.

5. The method of claim 3, wherein employing at least one lock acquisition history includes determining static reachability of a concurrent program with nested locks via thread-local reasoning.

6. The method of claim 3, wherein isolating the subset of lock and unlock statements includes identifying reachability barriers between control states.

7. The method of claim 1, wherein identifying the causality constraints includes indicating all possible interleavings of threads associated with the concurrent program that are feasible under scheduling constraints that are imposed by synchronization primitives in the concurrent program.

8. A computer readable storage medium comprising a computer readable program, wherein the computer readable program when executed on a computer causes the computer to perform the method recited in claim 1.

9. A method for removing locks from a concurrent program, comprising:
modeling a set of program behaviors associated with a concurrent program as causality constraints, wherein the set of program behaviors includes threads of the program which are feasible under the scheduling constraints imposed by the synchronization primitives set forth in the concurrent program, wherein the causality constraints are stored on a non-transitory computer readable storage medium;
identifying the causality constraints which preserve the behaviors of the concurrent program using at least one lock acquisition history, wherein each visible state which is not reachable from at least one other visible state is identified by a constraint identifier, and wherein the causality constraints are embedded into a common framework;
identifying lock and unlock statements in the concurrent program which enforce the identified causality constraints using at least one lock acquisition history, wherein lock and unlock statements which are employed to preserve the identified causality constraints are maintained, and redundant locks are removed from the concurrent program;
retaining the lock and unlock statements which enforce the identified causality constraints; and
discarding the lock and unlock statements which do not enforce the identified causality constraints.

10. The method of claim 9, wherein identifying lock and unlock statements includes employing the at least one lock acquisition history to isolate a subset of lock and unlock statements in the concurrent program that enforce the identified causality constraints which capture the set of behaviors associated with the concurrent program.

11. The method of claim 10, wherein employing the at least one lock acquisition history includes determining reachability between global control states by tracking lock access patterns locally in each individual thread of the concurrent program.

12. The method of claim 10, wherein employing at least one lock acquisition history includes determining static reachability of a concurrent program with nested locks via thread-local reasoning.

13. The method of claim 10, wherein isolating the subset of lock and unlock statements includes identifying reachability barriers between control states.

14. A system for removing locks from a concurrent program, comprising:
a constraint modeler configured to specify a set of program behaviors associated with a concurrent program as causality constraints, wherein the set of program behaviors includes threads of the program which are feasible under the scheduling constraints imposed by the synchronization primitives set forth in the concurrent program, wherein the causality constraints are stored on a non-transitory computer readable storage medium;
a constraint identifier configured to identify the causality constraints which preserve a set of behaviors associated with the concurrent program, wherein each visible state which is not reachable from at least one other visible state is identified by a constraint identifier, and wherein the causality constraints are embedded into a common framework; and
a lock identifier configured to identify lock and unlock statements in the concurrent program which enforce the identified causality constraints, wherein lock and unlock statements which are employed to preserve the identified causality constraints are maintained, and redundant locks are removed from the concurrent program.

15. The system of claim 14, wherein the system further comprises a lock remover configured to retain the lock and unlock statements which enforce the identified causality constraints, and discard any remaining lock and unlock statements.

16. The system of claim 14, wherein the lock identifier includes at least one lock acquisition history to isolate a subset of lock and unlock statements in the concurrent program that enforce the causality constraints which capture the set of behaviors associated with the concurrent program.

17. The system of claim 16, wherein the at least one lock acquisition history is employed to determine static reachability of a concurrent program with nested locks via thread-local reasoning.

18. The system of claim 16, wherein the at least one lock acquisition history is employed to determine reachability between global control states by tracking lock access patterns locally in each individual thread.

19. The system of claim 16, wherein isolating the subset of lock and unlock statements includes identifying reachability barriers between control states.

20. The system of claim 14, wherein the causality constraints indicate all possible interleavings of threads associated with the concurrent program that are feasible under scheduling constraints that are imposed by synchronization primitives in the concurrent program.

* * * * *